United States Patent
Riehl

(10) Patent No.: US 10,193,390 B2
(45) Date of Patent: Jan. 29, 2019

(54) WIRELESS POWER TRANSMITTER CONFIGURATION FOR POWER TRANSMISSION THROUGH A PARTITION

(71) Applicant: MediaTek Inc., Hsin-Chu (TW)

(72) Inventor: Patrick Stanley Riehl, Cambridge, MA (US)

(73) Assignee: MediaTek Inc., Hsin-Chu (TW)

( * ) Notice: Subject to any disclaimer, the term of this patent is extended or adjusted under 35 U.S.C. 154(b) by 476 days.

(21) Appl. No.: 14/872,479

(22) Filed: Oct. 1, 2015

(65) Prior Publication Data
US 2016/0261120 A1 Sep. 8, 2016

Related U.S. Application Data

(60) Provisional application No. 62/129,108, filed on Mar. 6, 2015.

(51) Int. Cl.
*H02J 50/12* (2016.01)
*H02J 50/90* (2016.01)
*H02J 50/80* (2016.01)

(52) U.S. Cl.
CPC ............ *H02J 50/12* (2016.02); *H02J 50/80* (2016.02); *H02J 50/90* (2016.02)

(58) Field of Classification Search
None
See application file for complete search history.

(56) References Cited

U.S. PATENT DOCUMENTS

| | | | | |
|---|---|---|---|---|
| 2009/0096413 A1* | 4/2009 | Partovi | .......... | H01F 5/003 320/108 |
| 2010/0207572 A1* | 8/2010 | Kirby | .......... | H02J 7/025 320/101 |
| 2011/0004278 A1* | 1/2011 | Aghassian | .......... | A61N 1/3787 607/61 |
| 2012/0153739 A1* | 6/2012 | Cooper | .......... | H02J 5/005 307/104 |
| 2012/0235506 A1* | 9/2012 | Kallal | .......... | H02J 5/005 307/104 |
| 2012/0242160 A1* | 9/2012 | Tseng | .......... | H04B 5/0037 307/104 |
| 2013/0193914 A1* | 8/2013 | Gaddam | .......... | H02J 7/007 320/108 |

FOREIGN PATENT DOCUMENTS

| CN | 204030733 U | 12/2014 |
|---|---|---|
| CN | 104362710 A | 2/2015 |

\* cited by examiner

*Primary Examiner* — Jared Fureman
*Assistant Examiner* — Joel Barnett
(74) *Attorney, Agent, or Firm* — Wolf, Greenfield & Sacks, P.C.

(57) ABSTRACT

Apparatus and methods for configuring power settings of a wireless power transmitter installed adjacent to a partition are described. A wireless power receiver may detect an amount of power transmitted through the partition from the power transmitter, and identify at least one power setting to the power transmitter that produces an acceptable level of wirelessly transferred power at the wireless power receiver. The power transmitter may store an identified power setting and subsequently operate at the setting identified by the wireless power receiver to provide wireless power through the partition for powering or charging a wirelessly powered device. By configuring a wireless power transmitter at an installation site, various partition thicknesses may be accommodated for through-table, wireless power transfer, for example.

27 Claims, 4 Drawing Sheets

WIRELESS POWER TRANSMITTER CONFIGURATION FOR POWER TRANSMISSION THROUGH A PARTITION

CROSS-REFERENCE TO RELATED APPLICATIONS

This application claims priority to U.S. provisional application Ser. No. 62/129,108, titled "Automatic Calibration Method for Through-Table Wireless Power Transmitter Unit," filed Mar. 6, 2015, which is hereby incorporated by reference in its entirety.

BACKGROUND

1. Technical Field

The techniques described herein relate generally to wireless power delivery, and particularly to calibration of wireless transmission strength to accommodate wireless power transfer through a surface at which a wireless power transmitter is installed.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a transmitting unit, sometimes referred to as a power transmitting unit (PTU), and a receiving unit, sometimes referred to as a power receiving unit (PRU). Such systems can be used to wirelessly power or charge mobile devices such as smartphones, portable music players, tablets, and laptops, among other devices and applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees such as the Wireless Power Consortium (WPC), the recently-merged Power Matters Alliance (PMA), and the Alliance for Wireless Power (A4WP), collectively A4WP/PMA, are working on developing international standards for consumer products based on wireless power transfer. The standards may include specifications on an amount of rectified current, voltage, and/or power generated at a PRU via the device's receiving coil and power rectification circuitry. The standards may also include specifications on a distance between a transmitting coil of a PTU and a receiving coil of a PRU.

SUMMARY

Some embodiments relate to methods and apparatus for configuring a wireless power transmitter at a location where the transmitter is installed to transmit power through a partition that is separate from the wireless power transmitter. The partition may be located between the transmitter and a wireless power device, and may have a thickness and power transmission characteristics that are not known prior to or during installation nor at the time of manufacture of a wireless power transmitter.

According to some embodiments, a method for configuring a wireless power transmitter to transmit power wirelessly through a partition between a wireless power receiver and the wireless power transmitter at an installation location of the wireless power transmitter may comprise an act of detecting, at the wireless power receiver, a plurality of signals representative of wirelessly received power levels at a receiving coil of the wireless power receiver. The power levels may correspond to wireless power transmitted by the wireless power transmitter through the partition. A method for configuring a wireless power transmitter may further include an act of identifying, to the wireless power transmitter, at least one transmit power level of the wireless power transmitter that provides an acceptable wirelessly received power level at the at least one receiving coil. An acceptable wirelessly received power level may be a level of power suitable for charging and/or operating a wireless power device.

In some embodiments, a wireless power receiver for configuring a wireless power transmitter to transmit power wirelessly through a partition between the wireless power receiver and the wireless power transmitter at an installation location of the wireless power transmitter may comprise at least one receiving coil and a signal transmitter. The wireless power receiver may further include circuitry configured to detect a plurality of signals representative of wirelessly received power levels at the at least one receiving coil, wherein the power levels correspond to wireless power transmitted by the wireless power transmitter through the partition. The circuitry may further be configured to provide data to at least one other device, wherein the data identifies at least one transmit power level of the wireless power transmitter that provides an acceptable wirelessly received power level at the at least one receiving coil. In some embodiments, the wireless power receiver may further include a memory device, a processor, and machine-readable instructions stored on the memory device that, when executed by the processor, adapt the wireless power receiver to detect the plurality of signals representative of wirelessly received power levels at the at least one receiving coil. The machine-readable instructions may further adapt the wireless power receiver to identify, to the wireless power transmitter via the signal transmitter, the at least one transmit power level of the wireless power transmitter that provides an acceptable wirelessly received power level at the at least one receiving coil.

Also contemplated are memory devices having machine-readable instructions that can adapt a wireless power transmitter to transmit power through a partition. In some embodiments, a memory device may store machine-readable instructions that, when executed by at least one processor of a wireless power receiver, adapt the wireless power receiver to detect a plurality of received power levels transmitted wirelessly by a wireless power transmitter through a partition to at least one receiving coil of the wireless power receiver at an installation location of the wireless power transmitter, and identify, to the wireless power transmitter, at least one transmit power level that provides an acceptable wirelessly received power at the location of the at least one receiving coil.

According to some embodiments, a method for configuring a wireless power transmitter to transmit power wirelessly through a partition that is adjacent to the wireless power transmitter at an installation location of the wireless power transmitter, may comprise acts of applying, by the wireless power transmitter, a plurality of wireless power levels to transmit power through the partition to at least one receiving coil of a wireless power receiver, and receiving, from the wireless power receiver, identification of at least one transmit power level that provides an acceptable wirelessly received power level at the location of the at least one receiving coil.

In some embodiments, a memory device may store machine-readable instructions that, when executed by at least one processor of a wireless power transmitter located adjacent to a partition at an installation location of the wireless power transmitter, adapt the wireless power transmitter to apply a plurality of wireless power levels to transmit power through the partition to at least one receiving coil of a wireless power receiver, and receive, from the wireless power receiver, identification of at least one transmit power level that provides an acceptable wirelessly received power level at the location of the at least one receiving coil.

According to some embodiments, a wireless power transmitter adapted to be installed adjacent to and transmit power through a partition that is separate from the wireless power transmitter may comprise at least one power transmitting coil and a signal transceiver. The wireless power transmitter may further include circuitry configured to apply a plurality of wireless power levels to transmit power through the partition to at least one receiving coil of a wireless power receiver, receive, from the wireless power receiver, identification of at least one transmit power level that provides an acceptable wirelessly received power level at the location of the at least one receiving coil, and store the at least one transmit power level. In some implementations, a wireless power transmitter may further include a memory device, a processor, and machine-readable instructions stored on the memory device that, when executed by the processor, adapt the wireless power transmitter to apply the plurality of wireless power levels to transmit power through the partition to at least one receiving coil of a wireless power receiver, and store the at least one transmit power level.

Some embodiments include a system for configuring a wireless power transmitter to transmit power wirelessly through a partition at an installation location of the wireless power transmitter. A system may comprise a wireless power transmitter adapted to be installed adjacent to and transmit power through a partition at an installation site of the wireless power transmitter, at least one power transmitting coil, a signal transmitter, at least one memory device, and a processor. The system may further include machine-readable instructions that, when executed by the processor, adapt the wireless power transmitter to apply a plurality of wireless power levels to transmit power through the partition to at least one receiving coil of a wireless power receiver, receive, from the wireless power receiver, identification of at least one transmit power level that provides an acceptable wirelessly received power level at the location of the at least one receiving coil, and store the at least one transmit power level. In some implementations, the system may further include machine-readable instructions that adapt the wireless power receiver to detect a plurality of wireless power levels transmitted by a wireless power transmitter through the partition to at least one receiving coil of the wireless power receiver, and identify, to the wireless power transmitter, the at least one transmit power level.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
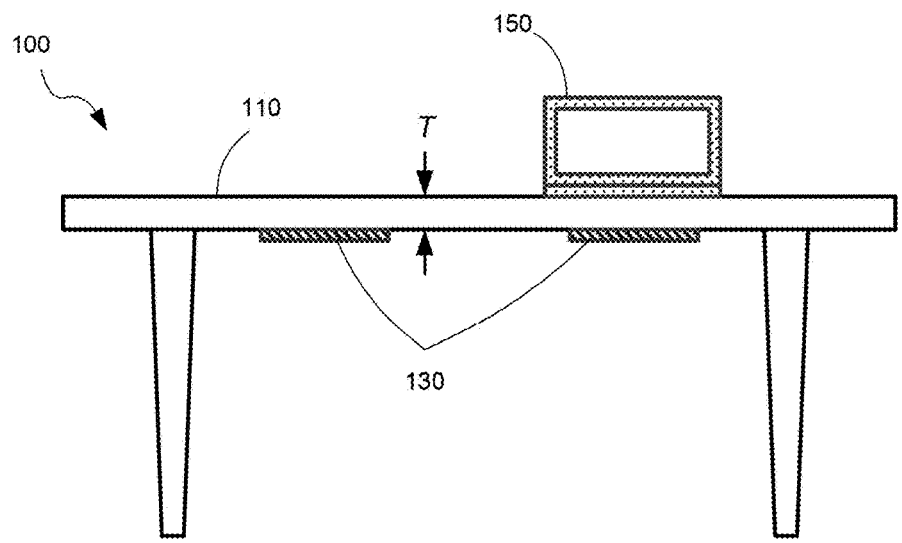
FIG. 1 depicts a table-mounted wireless power transmitter and wireless power device configured to be charged wirelessly, according to some embodiments.

Wireless power transmitters may be installed at or near a partition to provide wireless power transfer to a wireless power receiver on the other side of the partition. The partition may function as a support surface for the power transmitter and/or the wireless power receiver. As an example, wireless power transmitters may be installed on the bottom side of a tabletop or countertop, allowing a mobile device with a wireless power receiver to be charged and/or powered when the mobile device is placed on the support surface above the wireless power transmitter, which wirelessly transmits power through the surface.

Such an installation of wireless power transmitters may be used in a restaurant or café, for example, where wireless power transmitters may be installed on undersides of tabletops or countertops, so that patrons may charge or power their mobile devices while visiting such an establishment. Other implementations may occur in workplace or home environments. For example, wireless power transmitters may be mounted on an underside of a desk or countertop, so that it does not interfere with usable space on the top surface. In some implementations, wireless power transmitters may be mounted on undersides or hidden sides of furniture, such as a table, nightstand or cabinet. In various embodiments, wireless power transmitters may be installed under or otherwise adjacent to a wide variety of partitions for the transmission of wireless power to a wireless power receiver on the other side of the partition. Such partitions may have many different thicknesses and may be formed of a wide variety of different materials.

The inventors have recognized and appreciated that conventional wireless power transmitters and receivers are designed to wirelessly transfer power when a wireless power transmitter and receiver are separated by a predefined distance, which may be defined by a wireless power standard. If the wireless power transmitter and receiver are positioned too close together or too far apart, wireless power transmission may not be effective or may not be allowed due to protection circuitry in a wireless power receiver. Having a predefined distance between a transmitter and receiver is an obstacle for installing wireless power transmitters adjacent to partitions such as tables, countertops, etc., as they may have any of a variety of thicknesses and power transmission characteristics which are not known at the time of manufacture of a wireless power transmitter. For example, the separation distance may be different than that for which a wireless power transmitter and receiver are designed to operate. Since the thickness of a partition, at which a wireless power transmitter is installed, may not be known at the time the wireless power transmitter is manufactured or calibrated at a manufacturing facility, it may not be feasible or possible to configure a wireless power transmitter for an installation at the manufacturing facility.

The term "wireless power transmitter" may include, but is not limited to, power transmitting units (PTUs) that comply with recognized standards, such as Qi or any standards promulgated by committees or groups such as A4WP, PMA, and/or WPC. Similarly, the term "wireless power receiver" may include, but is not limited to, power receiving units (PRUs) that comply with recognized standards.

Described herein are techniques for configuring a wireless power transmitter at an installation such that it wirelessly transmits power at a suitable level to a wireless power receiver through a partition at which the wireless power transmitter is installed. Also described herein are a wireless power receiver that can facilitate configuration of a wireless power transmitter and a wireless power transmitter adapted to receive a configuration signal from a wireless power receiver. Such techniques and devices can allow installation and use of wireless power transmitters at a wide variety of partitions, and facilitate widespread adoption of wireless power transmitters.

An example implementation is depicted in FIG. 1. According to some embodiments, one or more wireless power transmitters 130 may be mounted on an underside of a partition 110. The partition may be a tabletop of a table 100, as depicted in the drawing, though embodiments are not limited to tabletops. In some cases, a partition may include a vertically-oriented structure such as a panel or wall. The partition may have a thickness T, which separates the power transmitter 130 from a wireless power device 150, which can be located on the partition 110 in a charging or power-transfer area of the power transmitter. The thickness T and/or power transfer characteristic of the partition may not be known before installation.

In operation, a power transmitter 130 may generate an oscillating magnetic field that extends through the partition 110. This oscillating magnetic field can transfer power wirelessly through the partition to the device 150 resting on the partition. Provided that the amplitude of the magnetic field falls within an acceptable range, the device 150 can receive and utilize power from the oscillating magnetic field.

The inventors have recognized and appreciated that a thickness or transmission property of a partition may not be known prior to installing a wireless power transmitter 130 adjacent to a partition, and therefore would not be known at the time of manufacture of the wireless power transmitter. Consequently, it may not be feasible to configure a power transmitter at the time of manufacture for widely varying installation environments. The inventors have recognized and appreciated that a wireless power receiver may be adapted to cooperate with a wireless power transmitter to configure a wireless power transmitter for operation at a particular installation. For example, a wireless power receiver may participate in a configuration process in which a wireless power transmitter located on an opposite side of a partition transmits power wirelessly to the receiver at a plurality of different power levels. The receiver may detect corresponding wireless power levels at its location, and identify to the transmitter which of the trialed power levels is or are at an acceptable level for operation of a wireless device (e.g., whether a voltage and/or current produced from the received wireless power complies with a wireless power standard). Further details of the apparatus and methods are provided below.

Figure 2:
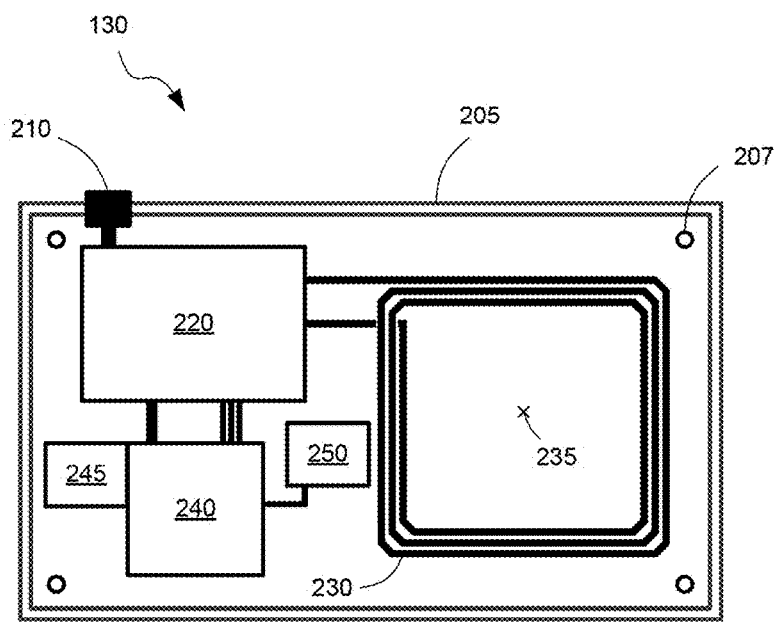
FIG. 2 illustrates components of a wireless power transmitter, according to some embodiments.

Some exemplary components of a wireless power transmitter 130 are depicted in FIG. 2. In some embodiments, a wireless power transmitter may comprise a conductive power transmitting coil 230 having a central axis 235. The coil 230 may comprise one or multiple conductive turns, and may be connected to a power converter 220. Coil 230, or any coil described herein, may have any suitable shape (e.g., square, rectangular, polygonal, circular, oval, etc.). A coil may be formed from one or multiple wound wires, or may be patterned as one or more conductive current loops on a printed circuit board. An oscillating current applied to the conductive coil produces an oscillating magnetic field in the vicinity of the coil 230, and can extend through partitions of different thicknesses. Components of a wireless power transmitting unit 130 may be mounted in an enclosure 205 that includes holes 207 for mounting the wireless power transmitter on a partition 110.

The power converter 220 may convert power from a power source to produce an oscillating current that is applied to the coil 230. In some embodiments, the power source may be an external source (e.g., a conventional residential or commercial AC line source, such as, but not limited to, 60 Hz, 100-127 VAC). Other examples of line power sources include 60 Hz, 220-240 VAC, 50 Hz, 100-127 VAC, and 50 Hz, 220-240 VAC. The power converter may receive power through a power jack 210 and/or an extension cord that plugs into a conventional residential of commercial AC power outlet or DC power outlet of a vehicle, for example. In some implementations, a power transmitter may include a battery (not shown), which may be connected to the power converter to provide uninterruptible power. In some embodiments, a power converter 220 may include a switched-mode power supply and filtering circuitry configured to convert power from a power source to oscillating current that is applied to the coil 230. The oscillating current may oscillate at a fixed frequency in compliance with wireless power transfer standards, or vary over a range of frequencies in compliance with other wireless power transfer standards. For example, the oscillating current may oscillate at approximately 6.78 MHz, though other frequencies may be used in some cases. In some embodiments, a power converter may include one or more impedance matching networks to facilitate power transfer between the power converter 220 and the power transmitting coil 230.

According to some embodiments, a wireless power transmitter 130 may further include a processor 240 and a signal transceiver 250. The processor may comprise a microcontroller, microprocessor, digital signal processor (DSP), field programmable gate array (FPGA), analog circuitry, logic circuitry, or a combination thereof, by way of example. The processor 240 may be in communication with at least one memory device 245, which may store machine-readable instructions that can be executed by the processor to adapt the wireless power transmitter 130 to execute operations related to power transmission and power configuration during installation. Memory device 245 may include RAM, ROM, flash memory, cached memory, or any other suitable memory. The processor may also communicate with the power converter 220. For example, the processor may be connected to the power converter with one or more electrical connections through which power and data may be transferred. Processor 240 may manage control of the power transmitter 130 by coordinating operation of, sending data to, and processing data from the power converter 220 and transceiver 250.

In some embodiments, the transceiver 250 may comprise a radio-frequency (RF) transmitter for transmitting and receiving data signals to and from an external device. Transceiver 250 may be configured for Wi-Fi or Bluetooth communications, for example, though transceiver 250 is not limited to only these communication protocols. In some implementations, transceiver 250 may be configured for wired communications (e.g., via a universal serial bus). In some implementations, the transceiver may include separate transmitting and receiving chips or circuits. In some embodiments, the transceiver 250 may use a same magnetic coupling link that is used for wireless power transmission to send and receive data from a wireless power receiver. Such communication processes may include, but are not limited to, "in-band communications," "load modulation," or "backscatter modulation".

Figure 3:
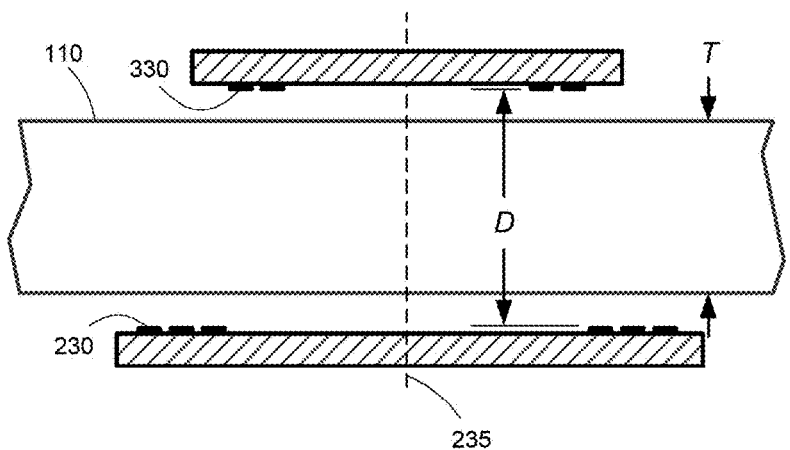
FIG. 3 depicts an arrangement of a wireless power transmitter coil mounted on an underside of a partition and a receiver coil, according to some embodiments.

When a wireless power transmitter 130 is mounted adjacent to a partition 110, its power transmitting coil 230 may be positioned in proximity to a receiving coil 330 of a wireless powered device 150, as depicted in FIG. 3. The receiving coil 330 and the transmitting coil 230 may be separated by a distance D. The distance D may be greater than the thickness T of the partition 110. In some cases, neither the thickness T, the distance D, nor a power transmission characteristic of the partition may be known prior to or when installing a power transmitter 130 nor at the time of manufacture of the power transmitter. Additionally, an amplitude of the oscillating magnetic field generated by the power transmitting coil 230 may decay in magnitude as a function of the distance D. In some cases, the decay in amplitude may be greater than $1/D^2$. Therefore an amount of power received at a receiving coil 330 may depend strongly upon the distance D, which is determined in part by the thickness T.

In many instances, a device 150 having a receiving coil 330 may be configured to operate or utilize power from the receiving coil only if the received power is within an acceptable range of power levels. In some implementations, an acceptable range of received power may be determined based upon rectified current and/or voltage produced from the receiving coil 330 and rectification circuitry. Expressed alternatively, a device 150 may only utilize power from its receiving coil 330 if the amplitude or magnitude of the oscillating magnetic field at the receiving coil is within an acceptable range of values.

An acceptable range of received power or magnetic field values may be established by wireless power transfer standards, in some embodiments. If a received power or magnetic field is greater than a specified standard or upper threshold value, protection circuitry within a device 150 may block and/or disable current from the coil 330 from being utilized by the device's circuitry. Similarly, if the received power or magnetic field is less than a specified standard or lower threshold value, protection circuitry may also block and/or disable current from the coil 330 from being utilized by the device's circuitry.

Figure 4:
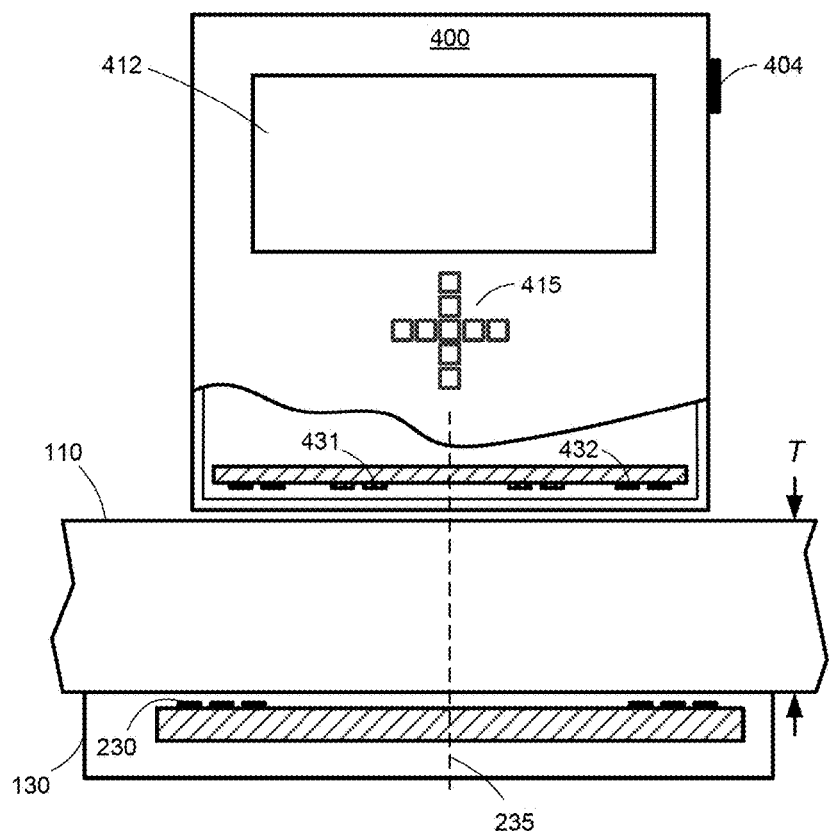
FIG. 4 depicts a wireless power receiver for detecting wireless power transmitted through a partition, according to some embodiments.

According to some embodiments, a wireless power receiver 400 (depicted in FIG. 4) may be used at the time of installing a wireless power transmitter 130 to detect power levels transmitted by the wireless power transmitter and configure the wireless power transmitter to output an acceptable power level for the installation environment. A wireless power receiver 400 may comprise a portable electronic device configured to be placed on a partition 110 adjacent to a wireless power transmitter 130. For example, a wireless power receiver 400 may be positioned in a charging area or power-transfer area where a device 150 would normally be positioned to receive power from a power transmitter 130 located on an opposite side of the partition. In some implementations, a wireless power receiver 400 may be embodied as a smart phone, tablet computer, laptop, or similar processing device that includes at least one receiving coil 330 and machine-readable instructions that adapt the device to execute acts of configuring a wireless power transmitter 130 to transmit power through a partition 110. In some implementations, a wireless power receiver may comprise circuitry that executes acts of configuring a wireless power transmitter 130 to transmit power through a partition 110.

In some embodiments, a wireless power receiver 400 may include at least one receiving coil 431, 432 arranged to be placed in close proximity to a partition 110. A wireless power receiver may include an electronic display 412, one or more illuminated (e.g., LED) indicators 415, and one or more user interface buttons 404. A user interface button 404 may be used to turn the wireless power receiver on and off. In some embodiments, the display 412 may comprise a touch screen, and be used to provide information about operation of the wireless power receiver and power levels detected from the wireless power transmitter, as well as provide a graphical user interface for user operation. In some implementations, a wireless power receiver 400 may not include a display 412, and instead communicate with an intermediary device (e.g., a smart phone or laptop), which may be used to receive data from and transmit data including commands to the wireless power receiver. In some embodiments, a user interface of the intermediary device may be operated by a user and/or used to display information during a transmitter power configuration process. Because a power transmitter may be occluded from view by the partition 110, a wireless power receiver may be configured to sense misalignment between a central axis of a receiving coil 330 and the central axis 235 of the transmitting coil 230. In some embodiments, at least one indicator 415 may provide information about operation of the wireless power receiver 400 and/or centering a receiving coil of the wireless power receiver over a power transmitting coil 230 of the wireless power transmitter.

Figure 5A:
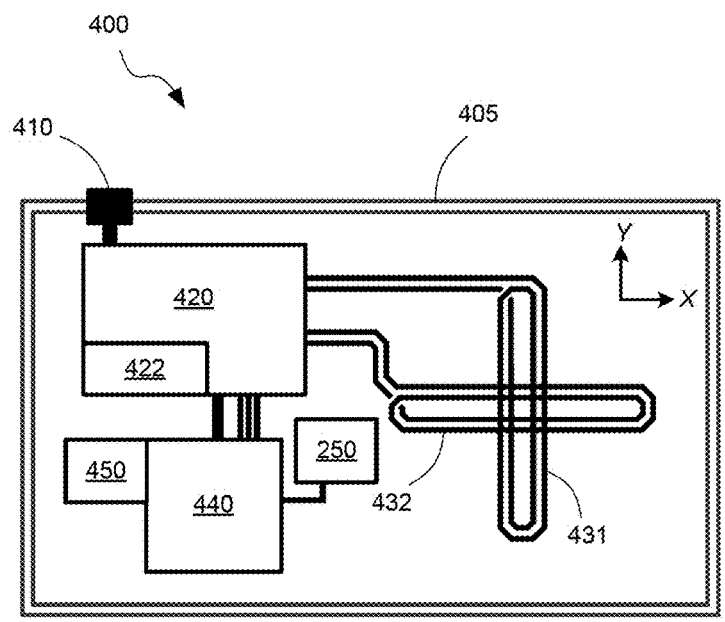
FIG. 5A depicts components of a wireless power receiver, according to some embodiments.

FIG. 5A depicts some components of a wireless power receiver 400, according to some embodiments. Components of a wireless power receiver may be housed in an enclosure 405 and include a power converter 420, a processor 440, at least one memory device 450, and a signal transceiver 250. The transceiver may be a device as described in connection with the power transmitter of FIG. 2. In some embodiments, a wireless power receiver 400 may include a power jack 410 for receiving power from an external source. In some implementations, a wireless power receiver may include an on-board power source such as a battery 422 that may be charged from power received through power jack 410. In some implementations, the battery 422 may be charged from power received wirelessly via a receiving coil 330, and a wireless power receiver may not include a power jack 410. According to some embodiments, a wireless power receiver may include two or more field-locating coils 431, 432 than may aid in determining a location of highest magnetic field strength from a wireless power transmitter. In some embodiments, a wireless power receiver may comprise a single receiving coil, which may be a standard receiving coil for a device, such as a smart phone. In some implementations, a wireless power receiver 400 may comprise a smart phone or other portable device that uses its wireless receiving coil for a calibration process according to the described embodiments. For example, a smart phone may be adapted with an application to implement a calibration process as described in the present application.

The wireless power receiver's processor 440 may comprise a microcontroller, microprocessor, DSP, FPGA, analog circuitry, logic circuitry, or a combination thereof. The processor 440 may be in communication with at least one memory device 450, which may store machine-readable instructions that can be executed by the processor to adapt the wireless power receiver to execute operations related to detecting received power and calibration of a wireless power transmitter. Memory device 450 may include RAM, ROM, flash memory, cached memory, or any other suitable memory. The processor may also communicate with the power converter 420. Processor 440 may manage control of the wireless power receiver 440 by coordinating operation of, sending data to, and processing data from the power converter 420 and transceiver 250.

The power converter 420 may, in some embodiments, convert wirelessly transferred power received at receiving coil 330 into a signal or form useable by the wireless power receiver. For example, a receiving coil 330 may generate alternating current having a frequency of the oscillating magnetic field within the coil. Power converter 420 may include half-wave or full-wave rectification circuitry and/or a switched-mode power converter to convert the alternating current into a DC current and/or DC voltage. In some embodiments, rectification circuitry may comprise diode bridges and at least one capacitor. Any suitable rectification circuitry may be used. The magnitude of the converted current or voltage may be representative of a received wireless power at the receiving coil 330. The magnitude of the converted current or voltage may also be representative of an amplitude of the oscillating magnetic field at the receiving coils. In some implementations, the power converter may not rectify the alternating current, and instead determine an amplitude of the alternating current produced by the coil 330. For example, the power converter may include a current sensor configured to detect an amplitude of alternating current generated in the receiving coil. The amplitude of the alternating current produced by the coil may be representative of a received wireless power and/or magnetic field amplitude at the receiving coil 330.

In some embodiments, the power converter 420 may receive power for operation from an external source through a power jack 410 and/or an extension cord that plugs into a conventional AC power outlet. The power source may be a conventional residential or commercial AC line source, such as, but not limited to, 60 Hz, 120 VAC. In some implementations, a wireless power receiver may include a battery 422, which may be charged through power jack 410. According to some embodiments, a power converter 420 may include a switched-mode power supply and filtering circuitry configured to convert power from a power source to a form of power useable by the wireless power receiver. In some embodiments, a power converter 420 may include one or more impedance matching networks to improve power coupling between the power converter 420 and a power receiving coil 330.

According to some implementations, the processor 440 may communicate with external devices such as a wireless power transmitter 130 using the transceiver 250. For example, a wireless power receiver may transmit information to a power transmitter during configuration of an installed power transmitter. The information may include an identification of one or more power settings, trialed by the power transmitter, that produce an acceptable transferred power level at a receiving coil 330 of the wireless power receiver. The identification may comprise a Boolean value in some embodiments (e.g., identifying whether a detected wireless power level is in compliance or out of compliance), or may comprise a value representative of a detected wireless power level. In some instances, the processor 440 may communicate with another data-processing device (e.g., a smart phone, networked computer, personal computer, tablet, laptop, etc.) that may process data from the wireless power receiver during a configuration process. For example, a smart phone may receive data from a wireless power receiver and process the data to determine whether a wireless power received by the wireless power receiver complies with a predefined standard. The smart phone may then indicate to the wireless power receiver 400 or wireless power transmitter 130 whether a power setting, trialed by the power transmitter, produces an acceptable transferred power level at the receiving coil 330 of the wireless power receiver.

In some embodiments, a wireless power receiver may comprise a first coil 431 and a second coil 432 that form different current loops. The first coil and second coil may be elongated (e.g., in an oval or rectangular shape having a narrow width along one direction and a wide width along an orthogonal direction. By having such an elongated shape, a coil may be more sensitive to changes in an oscillating magnetic field strength along one direction compared to an orthogonal direction. For example, the first coil 431 may be more sensitive to changes or gradients in magnetic field strength along an X direction than along a Y direction. Similarly, the second coil 432 may be more sensitive to changes in magnetic field strength along the Y direction. Because of their anisotropic shape, the coil pair can provide separate positioning information for X and Y movement of the wireless power receiver when a user attempts to center the receiver's coil 330 over a transmitting coil 230 of a wireless power transmitter. The coil pair may aid in alignment of the receiver to an occluded power transmitter.

In some implementations, the field-locating coils 431, 432 may be in addition to a power receiving coil 330 of a wireless power receiver. In other embodiments, one or more of the field-locating coils may also be used as a power receiving coil. For example, a calibration value may be used to account for differences in power received by a field-locating coil and power received by a standard receiving coil 330 of a device 150. In some embodiments, a wireless power receiver may not include field-locating coils, and instead include a circular, isotropic coil. The wireless power receiver may be configured to display or indicate a value representative of a strength of an oscillating magnetic field within the coil.

Figure 5B:
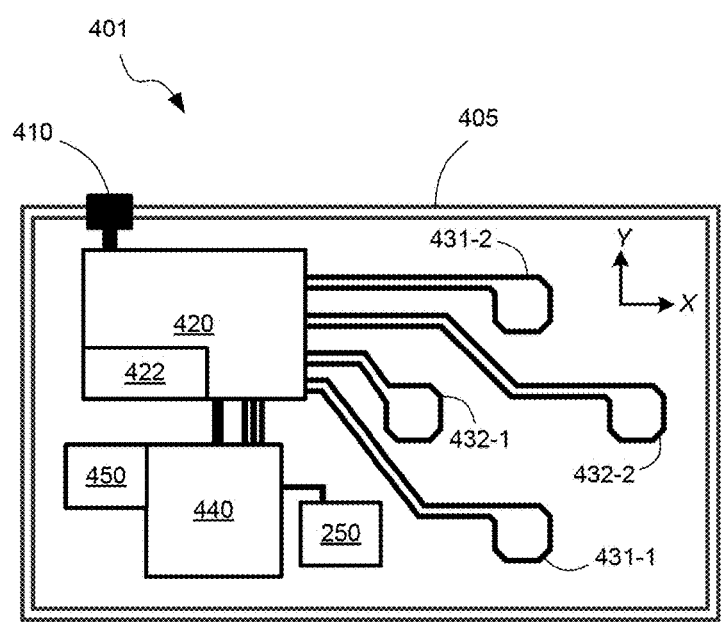
FIG. 5B depicts components of a wireless power receiver, according to some embodiments.

An alternative embodiment of the wireless power receiver 401 is depicted in FIG. 5B. Elements that are described for the wireless power receiver of FIG. 5A are identified with the same reference numerals. In some embodiments, a wireless power receiver 401 may comprise two pairs of field-locating coils having their centers located in different places. For example a first pair of field-locating coils 431-1, 431-2 may be spaced apart in a Y direction. A second pair of field-locating coils 432-1, 432-2 may be spaced apart in an X direction. In some implementations, a pair of receiver coils 431-1, 431-2 may directly detect a gradient in an oscillating magnetic field in a direction in which the coils are separated. For example, a stronger value of an alternating magnetic field at the location of a first coil 431-1 may provide a higher rectified voltage than would be the case for a second coil 431-2 located at a region of lower magnetic field. Processor 440 may determine the gradient direction (e.g., by comparing rectified currents or voltages from the separate coils) and indicate to a user (via a display 412 or indicator 415) a direction to move the wireless power receiver into a higher magnetic field. Accordingly, a user may be guided by the wireless power receiver when centering the wireless power receiver over a power transmitter.

In some cases, a wireless power receiver 400 may not include a processor such as a microcontroller, microprocessor, digital signal processor (DSP), or field programmable gate array (FPGA), and may not include a memory device. Instead, a wireless power receiver may include analog and/or digital circuitry that detects signals from one or more coils, and provides an analog or digital data signal representative of a power level detected at the one or more coils. The data may be broadcasted with a transmitter to at least one other device, that can receive and process the data. The data may comprise a value representative of a detected power level or may comprise a Boolean value (e.g., indicating whether or not a detected power level is above or below a compared value). Regardless of the type of information in the broadcasted data, the data may identify to another device whether a detected power level is and acceptable wirelessly received power level at the one or more receiving coils. Such a wireless power receiver may be placed at a measurement location, and repeatedly broadcast its data representative of a power level detected at the one or more coils. The wireless power receiver may communicate with at least one other device through a wired or wireless link.

In some implementations, a wireless power transmitter 130 may not include a processor such as a microcontroller, microprocessor, digital signal processor (DSP), or field programmable gate array (FPGA). Instead, functionality of a wireless power transmitter 130 may be executed with digital and/or analog circuitry. For example, a wireless power transmitter may include circuitry to initiate a power-level configuration process automatically upon start up. During this configuration process, the wireless power transmitter 130 may step through a sequence of power levels and await identification from a wireless power receiver of an acceptable power level detected at the receiver. After receiving the identification, the wireless power transmitter may select a corresponding transmit power level for subsequent operation.

Figure 6:
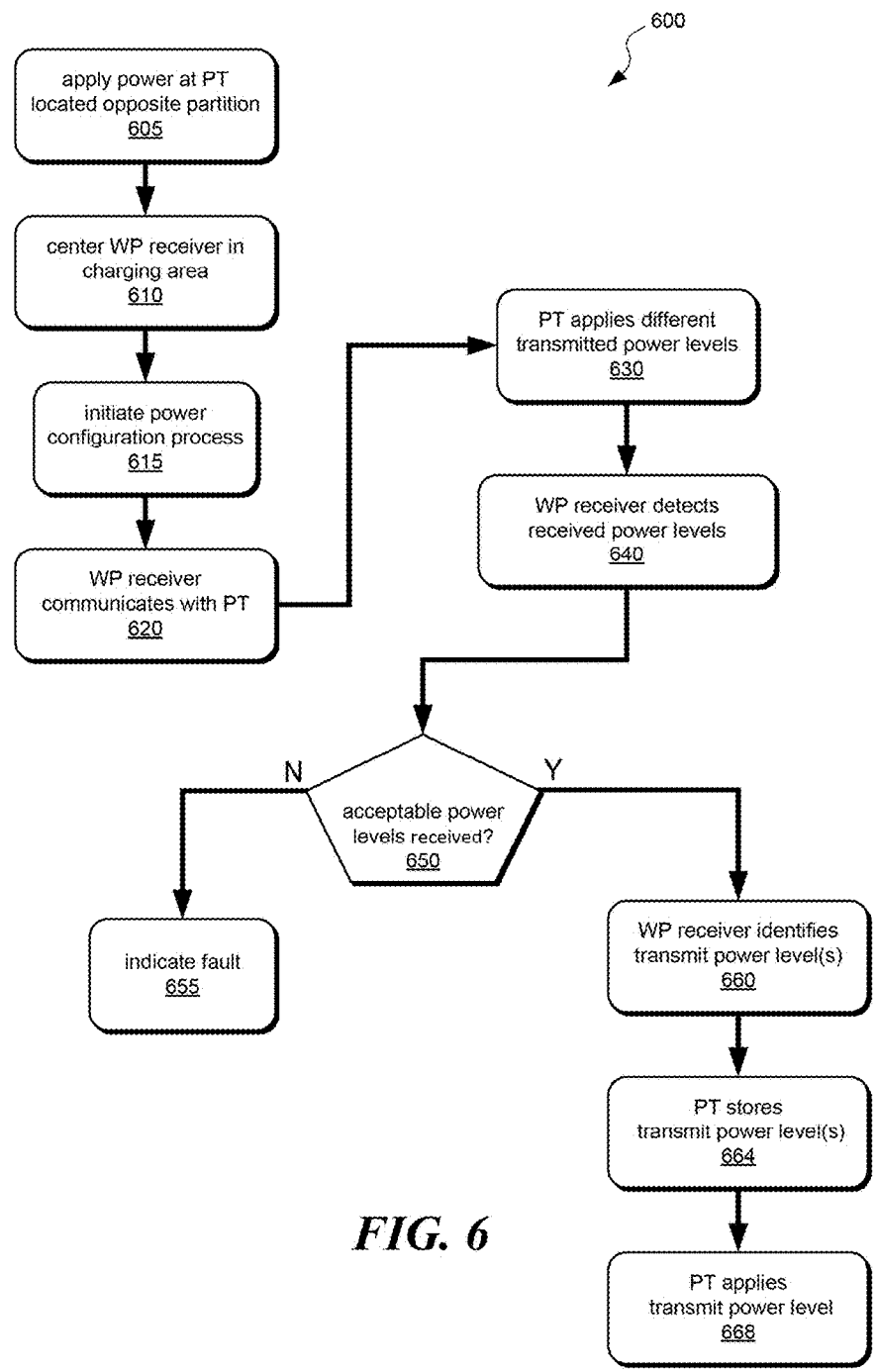
FIG. 6 is a flow chart illustrating acts of a method for configuring a wireless power transmitter for through-partition power transfer, according to some embodiments.

An example method 600 for configuring a wireless power transmitter 130 to operate in compliance with acceptable power transfer levels when installed adjacent to a partition 110 is depicted in FIG. 6. Some embodiments may include more or fewer acts than those depicted in the drawing. Some embodiments may include the depicted acts performed in a different order. Some of the acts may be performed by a wireless power receiver or by a power transmitter. Some of the acts may be performed by another device (e.g., a smart phone, networked computer, laptop, etc.) that communicates with one or both of the wireless power receiver and power transmitter. Some acts may be performed by a user.

According to some embodiments, a method 600 may comprise applying power (act 605) at a wireless power transmitter installed adjacent to a partition, and centering (act 610) a wireless power receiver in a charging area corresponding to the wireless power transmitter. The charging area may be a region surrounding a central axis 235 of a power transmitting coil 230 of the wireless power transmitter. A method 600 may further include initiating (act 615) a power configuration program on the wireless power receiver 400 and/or wireless power transmitter 130. The power configuration program and may cause the wireless power receiver to communicate (act 620) with the wireless power transmitter 130. The act of initiating a power configuration program may include transmitting a signal to the power transmitter that prompts initiation, at the power transmitter, of a power configuration routine. The communication may include a command or signal that prompts the wireless power transmitter to apply (act 630) different power levels to its power transmitting coil 230.

A power configuration method 600 may further include detecting (act 640), at the wireless power receiver, a plurality of wirelessly transferred power levels received from the wireless power transmitter. The act of detecting a plurality of power levels may comprise detecting a plurality of signals (e.g., rectified current or voltage levels, alternating current amplitude or power) produced by the wireless power receiver that are representative of an amplitude of the oscillating magnetic field at a receiving coil of the wireless power receiver or of a current generated in the receiving coil by the oscillating magnetic field.

According to some embodiments, a wireless power receiver may determine (act 650) whether at least one acceptable power level was detected at the location of the receiving coil of the wireless power receiver. The act of determining may comprise comparing a detected power level (or rectified current or voltage) against one or more predefined values. The predefined values may be standards established by a wireless power transfer organization, and may be stored in memory (e.g., in look-up-tables) on a wireless power receiver.

If it is determined (act 650) that at least one acceptable power level has been detected at the wireless power receiver, a method 600 may further include identifying (act 660) to the wireless power transmitter that an acceptable wirelessly received power level has been detected. A method 600 may further include storing (act 664), by the wireless power transmitter, at least one transmit power level corresponding to the detected acceptable wirelessly received power level or levels. In some embodiments, a method 600 may further include applying (act 668) one or more of the stored transmit power levels. An act of storing a transmit power level may comprise storing a setting value or other identifier that corresponds to a transmit power output of the wireless power transmit. An act of applying a transmit power level may comprise retrieving the setting value or identifier and generating the corresponding transmit power output.

The act of identifying (act 660) may, in some cases, comprise identifying directly to the wireless power transmitter that an acceptable wirelessly received power level has been detected. For example, a wireless power receiver may communicate information (e.g., numerical, text, and/or Boolean value) directly to the wireless power transmitter that indicates to the wireless power transmitter, or can be processed by the wireless power transmitter to determine, that an acceptable wirelessly received power level has been detected at a receiving coil or coils of the wireless power receiver. In some embodiments, the act of identifying (act 660) may comprise identifying indirectly to the wireless power transmitter that an acceptable wirelessly received power level has been detected. For example, information representative of a detected wireless power level at the wireless power receiver may be transmitted to an intermediary (e.g., a smart phone, a server, a laptop, etc.) between the wireless power receiver and wireless power transmitter. The intermediary may or may not process data from the wireless power receiver. The intermediary may transmit the data or results of the processed data to the wireless power transmitter. The data provided from the intermediary may identify to the wireless power transmitter that an acceptable wirelessly received power level has been detected at the wireless power receiver.

In some embodiments, different wireless devices 150 may require or accommodate different amounts of wirelessly transferred power at a receiving coil 330. For example, a laptop may accommodate more power than a smart phone. Televisions may accommodate more power than laptops. In some cases, different devices may be identified with a device identifier that identifies an amount of wireless power that can be received and utilized by the device. The device identifier may be transmitted from a device to a wireless power transmitter during a handshake, for example, before power transfer begins. In some implementations, a device may also transmit information identifying a power level that can be accommodated by the device. The device identifiers and corresponding power levels may be established and agreed-upon standards.

In some embodiments, a wireless power receiver may determine (act 650) whether detected power levels comply with acceptable power levels for different device types and/or power settings identified by a device, and indicate to a wireless power transmitter that a power setting complies with or meets an acceptable power level for a particular device type and/or identified power setting. For example, a wireless power receiver may identify (act 660) both an acceptable power setting and associated device identifier. A wireless power transmitter may then store (act 664) one or more power settings in association with corresponding device identifiers. According to some embodiments, a wireless power transmitter may subsequently detect a device and device type in its charging area, and apply (act 668) a stored power setting corresponding to the particular device identifier. In some embodiments, a wireless power transmitter may further detect a power level indicator along with a device identifier, and apply a power setting acceptable for the identified device type and identified power level, In some embodiments, a wireless power receiver 400 may determine (act 650) that none of the detected power levels comply with an acceptable power level at the wireless power receiver. Accordingly, the wireless power receiver may indicate (act 655) a fault condition.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. For example, an apparatus, structure, device, layer, or region recited as "including," "comprising," or "having," "containing," "involving," a particular material is meant to encompass at least the material listed and any other elements or materials that may be present.

What is claimed is:

1. A method for configuring a wireless power transmitter to transmit power wirelessly through a partition between a wireless power receiver and the wireless power transmitter at an installation location of the wireless power transmitter, the method comprising:

detecting, at the wireless power receiver, a plurality of signals representative of wirelessly received power levels by at least one receiving coil of the wireless power receiver, wherein the power levels correspond to wireless power transmitted in a sequence of power levels by the wireless power transmitter through the partition;

indicating, on a display of the wireless power receiver, a direction in which to move the wireless power receiver to receive a higher magnetic field from the wireless power transmitter; and identifying by the wireless power receiver, to the wireless power transmitter, at least one transmit power level of the power levels received from the wireless power transmitter that provides a received power level at the at least one receiving coil that is suitable for charging and/or operating a wireless power device, wherein the identifying occurs after the plurality of signals have been detected by the wireless power receiver.

2. The method of claim 1, wherein the partition comprises a tabletop, desktop, or countertop and the wireless power transmitter is mounted on an underside of the partition.

3. The method of claim 1, further comprising:

detecting, by the wireless power receiver, a first gradient in wireless power transmitted by the wireless power transmitter; and indicating the direction to move the wireless power receiver based on at least the first gradient.

4. The method of claim 1, wherein the detecting comprises:

rectifying an alternating current produced in at least one receiving coil; and producing a rectified voltage corresponding to the rectified alternating current.

5. The method of claim 4, further comprising:

comparing the rectified voltage to a voltage threshold value for wireless power transfer; and determining whether the rectified voltage exceeds the voltage threshold value for wireless power transfer.

6. The method of claim 1, wherein the detecting comprises:

detecting an amplitude of an alternating current produced in at least one receiving coil;

computing a level of magnetic field at the at least one receiving coil based upon the detected amplitude of alternating current;

comparing the level of magnetic field to a magnetic field threshold value for wireless power transfer; and determining whether the level of magnetic field exceeds the magnetic field threshold value for wireless power transfer.

7. The method of claim 1, further comprising indicating a fault condition if at least one transmit power level does not provide the power level at the at least one receiving coil that is suitable for charging and/or operating the wireless power device and the wireless power transmitter has trialed a full range of transmit power levels.

8. A wireless power receiver for configuring a wireless power transmitter to transmit power wirelessly through a partition between the wireless power receiver and the wireless power transmitter at an installation location of the wireless power transmitter, the wireless power receiver comprising:
  at least one receiving coil;
  a signal transmitter;
  a display that indicates a first direction and a second direction orthogonal to the first direction in which to move the wireless power receiver to receive a higher magnetic field from the wireless power transmitter; and
  circuitry configured to detect a plurality of signals representative of wirelessly received power levels at the at least one receiving coil, wherein the power levels correspond to wireless power transmitted in a sequence of power levels by the wireless power transmitter through the partition and to provide, by the wireless power receiver after the plurality of signals have been detected, data to at least one other device, wherein the data identifies at least one transmit power level of the wireless power transmitter that provides a received power level at the at least one receiving coil that is suitable for charging and/or operating a wireless power device and wherein at least one of the plurality of signals represents a received power level that is not acceptable for charging and/or operating the wireless power device.

9. The wireless power receiver of claim 8, wherein the received power level that is suitable for charging and/or operating a wireless power device is within a predefined range of power levels.

10. The wireless power receiver of claim 8, further comprising:
  a memory device;
  a processor; and
  non-transitory machine-readable instructions stored on the memory device that, when executed by the processor, adapt the wireless power receiver to identify, to the wireless power transmitter via the signal transmitter, the at least one transmit power level of the wireless power transmitter that provides the received power level at the at least one receiving coil that is suitable for charging and/or operating a wireless power device.

11. The wireless power receiver of claim 10, further comprising rectification circuitry configured to rectify an alternating current generated in the at least one receiving coil and produce a rectified voltage, wherein the non-transitory machine-readable instructions further adapt the wireless power receiver to:
  compare the rectified voltage to a voltage threshold value for wireless power transfer; and
  determine whether the rectified voltage exceeds the voltage threshold value.

12. The wireless power receiver of claim 10, further comprising a current sensor configured to detect an amplitude of alternating current generated in the at least one receiving coil, wherein the non-transitory machine-readable instructions further adapt the wireless power receiver to:
  determine a level of magnetic field at the location of the at least one receiving coil;
  compare the level of magnetic field to a magnetic field threshold value for wireless power transfer; and
  determine whether the level of magnetic field exceeds the magnetic field threshold value for wireless power transfer.

13. The wireless power receiver of claim 10, wherein the non-transitory machine-readable instructions further adapt the wireless power receiver to:
  detect a gradient in an oscillating magnetic field produced by the wireless power transmitter; and
  indicate a direction on the display to move the wireless power receiver based on the gradient.

14. The wireless power receiver of claim 8, wherein the at least one receiving coil comprises a pair of elongated coils that are orthogonal to each other.

15. The wireless power receiver of claim 8, wherein the at least one receiving coil comprises two pairs of receiving coils that have centers located at different positions.

16. A memory device storing non-transitory machine-readable instructions that, when executed by at least one processor of a wireless power receiver, adapt the wireless power receiver to:
  detect a first gradient in an oscillating magnetic field at the wireless power receiver;
  detect a second gradient in the oscillating magnetic field at the wireless power receiver;
  indicate on a display at the wireless power receiver a direction to move the wireless power receiver based on the first gradient and the second gradient;
  detect a plurality of received power levels transmitted wirelessly in a sequence of power levels by a wireless power transmitter through a partition to at least one receiving coil of the wireless power receiver at an installation location of the wireless power transmitter; and
  identify by the wireless power receiver, to the wireless power transmitter, at least one transmit power level of the received power levels that provides a received power at the location of the at least one receiving coil that is suitable for charging and/or operating a wireless power device, wherein the identifying occurs after the plurality of signals have been detected by the wireless power receiver.

17. The memory device of claim 16, wherein the received power that is suitable for charging and/or operating the wireless power device corresponds to a predefined range of power values.

18. A method for configuring a wireless power transmitter to transmit power wirelessly through a partition that is adjacent to the wireless power transmitter at an installation location of the wireless power transmitter, the method comprising:
  applying, by the wireless power transmitter, a plurality of wireless power levels to transmit power in a sequence of power levels through the partition to at least one receiving coil of a wireless power receiver; and
  receiving, from the wireless power receiver in response to application of the plurality of wireless power levels and after transmitting the sequence of power levels, identification of at least one transmit power level from the plurality of wireless power levels that provides a received power level at the location of the at least one receiving coil that is suitable for charging and/or operating a wireless power device, wherein at least one of the power levels in the sequence of power levels is not acceptable for charging and/or operating the wireless power device.

19. The method of claim 18, further comprising:
  storing, by the wireless power transmitter, the at least one transmit power level; and applying a stored transmit power level from the at least one stored transmit power level responsive to detecting a device configured to be charged or powered by the wireless power transmitter.

20. The method of claim 18, further comprising:
storing, by the wireless power transmitter, plural transmit power levels in association with plural device identifiers corresponding to different types of wirelessly powered devices;
detecting, by the wireless power transmitter, a first type of wirelessly powered device; and
applying, responsive to detecting the first type of wirelessly powered device, a transmit power level stored in association with an identifier for the first type of wirelessly powered device.

21. A memory device storing non-transitory machine-readable instructions that, when executed by at least one processor of a wireless power transmitter located adjacent to a partition at an installation location of the wireless power transmitter, adapt the wireless power transmitter to:
apply a plurality of wireless power levels to transmit power in a sequence of power levels through the partition to at least one receiving coil of a wireless power receiver; and
receive, from the wireless power receiver in response to application of the plurality of wireless power levels and after transmitting the sequence of power levels, identification of at least one transmit power level from the plurality of wireless power levels that provides a received power level at the location of the at least one receiving coil that is suitable for charging and/or operating a wireless power device, wherein at least one of the power levels in the sequence of power levels is not acceptable for charging and/or operating the wireless power device.

22. The memory device of claim 21, further comprising non-transitory machine readable instructions that adapt the wireless power transmitter to:
store the at least one transmit power level; and
apply a stored transmit power level from the at least one stored transmit power level responsive to detecting a device configured to be charged or powered by the wireless power transmitter.

23. A wireless power transmitter adapted to be installed adjacent to and transmit power through a partition that is separate from the wireless power transmitter, the wireless power transmitter comprising:
at least one power transmitting coil;
a signal transceiver; and
circuitry configured to:
apply a plurality of wireless power levels to transmit power in a sequence of power levels through the partition to at least one receiving coil of a wireless power receiver;
receive, from the wireless power receiver in response to application of the plurality of wireless power levels and after transmitting the sequence of power levels, identification of at least one transmit power level from the plurality of wireless power levels that provides a received power level at the location of the at least one receiving coil that is suitable for charging and/or operating a wireless power device, wherein at least one of the power levels in the sequence of power levels is not acceptable for charging and/or operating the wireless power device; and
store the at least one transmit power level.

24. The wireless power transmitter of claim 23, further comprising:
a memory device;
a processor; and
non-transitory machine-readable instructions stored on the memory device that, when executed by the processor, adapt the wireless power transmitter to apply the plurality of wireless power levels and store the at least one transmit power level.

25. The wireless power transmitter of claim 24, wherein the non-transitory machine-readable instructions further adapt the wireless power transmitter to apply a transmit power level from the at least one stored transmit power level responsive to detecting a device configured to be charged or powered by the wireless power transmitter.

26. The wireless power transmitter of claim 24, wherein the non-transitory machine-readable instructions further adapt the wireless power transmitter to:
store plural transmit power levels in association with plural device identifiers corresponding to different types of wirelessly powered devices;
detect a first type of wirelessly powered device; and
apply a transmit power level stored in association with an identifier for the first type of wirelessly powered device.

27. A system comprising:
a wireless power transmitter adapted to be installed adjacent to and transmit power through a partition at an installation site of the wireless power transmitter;
at least one power transmitting coil;
a signal transmitter;
at least one memory device;
a processor;
non-transitory machine-readable instructions that, when executed by the processor, adapt the wireless power transmitter to:
apply a plurality of wireless power levels to transmit power in a sequence of power levels through the partition to at least one receiving coil of a wireless power receiver;
receive, from the wireless power receiver in response to application of the plurality of wireless power levels, identification of at least one transmit power level from the plurality of wireless power levels that provides a received power level at the location of the at least one receiving coil that is suitable for charging and/or operating a wireless power device; and
store the at least one transmit power level; and
non-transitory machine-readable instructions that adapt the wireless power receiver to:
detect a first gradient in an oscillating magnetic field received at the wireless power receiver;
detect a second gradient in the oscillating magnetic field at the wireless power receiver;
indicate on a display at the wireless power receiver a first direction to move the wireless power receiver based on the first gradient;
indicate on the display a second direction, orthogonal to the first direction, to move the wireless power receiver based on the second gradient;
detect, by the wireless power receiver, a plurality of received wireless power levels transmitted by a wireless power transmitter through the partition to at least one receiving coil of the wireless power receiver; and identify by the wireless power receiver, to the wireless power transmitter, the at least one transmit power level after the plurality of signals have been detected by the wireless power receiver.

* * * * *